April 2, 1929.  H. WODTKE  1,707,700
REENFORCED ELECTRIC CABLE
Filed Sept. 20, 1921
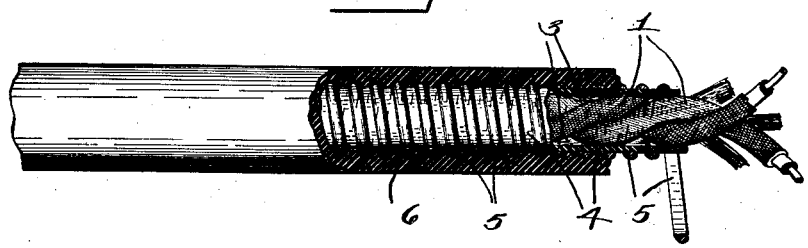
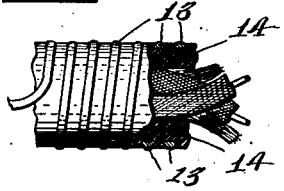
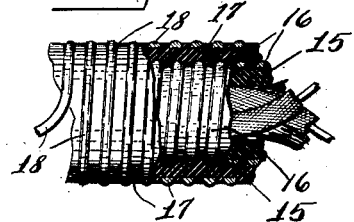
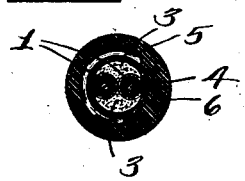
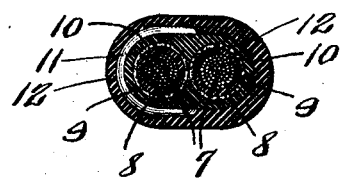
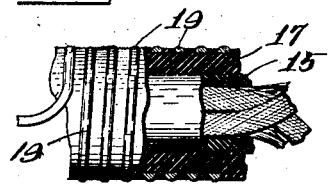
Hans Wodtke INVENTOR.
BY
Parsons & Bodell ATTORNEYS.

Patented Apr. 2, 1929.

1,707,700

UNITED STATES PATENT OFFICE.

HANS WODTKE, OF BUFFALO, NEW YORK, ASSIGNOR, BY MESNE ASSIGNMENTS, TO GENERAL CABLE CORPORATION, OF NEW YORK, N. Y., A CORPORATION OF NEW JERSEY.

REENFORCED ELECTRIC CABLE.

Application filed September 20, 1921. Serial No. 501,890.

This invention relates to electric cables and has for its object the production of a reenforced armored cable, which is simple in construction, economical of manufacture and capable of withstanding great strains, twistings and compression strains, and of being wound and unwound on a reel or coiled, and dragged over rough ground and surfaces without injury and also which offers great resistance to kinking.

The invention consists in the novel features and in the combinations and constructions hereinafter set forth and claimed.

In describing this invention, reference is had to the accompanying drawings, in which like characters designate corresponding parts in all the views.

Figure 1 is an elevation of a cable embodying my invention, a portion of the rubber casing being partly removed laying bare the coiled metal armor and the coiled armor being partly removed baring the rubber sheathing.

Figure 2 is a sectional view of one form of cable embodying my invention.

Figure 3 is a sectional view of another form thereof.

Figures 4, 5 and 6 are views similar to Fig. 1 of other forms of my armored cable.

This armored cable comprises a cable having the usual insulated and braided conductor or conductors, a fibrous filler or covering of suitable material laid parallel with the conductor or conductors and a sheathing as of rubber or rubber compound or similar material around said conductor or conductors and fillers and in addition an armor around the sheathing and also preferably a rubber casing or casing of rubber compound or similar material enclosing the armor and joined to the sheathing through the passages in the armor.

In Fig. 1, 1 designates the insulated conductors, there being two shown twisted together. One conductor or any plural number of conductors may be embodied in the cable. 3 designates the filler or covering laid parallel with the conductors and 4 the sheathing of rubber.

5 is the armor which is a metal strand coiled spirally around the sheathing, and 6 is the casing of rubber, rubber compound or equivalent material. The casing is joined to the sheathing 4, or portion of the cable within the armor 5 through the spaces between the coils of the armor 5, and hence the armor is embedded in the inner face of the casing 6, or the outer face of the sheathing.

The casing 6 is molded and compressed on the armor 5 by passing the cable between molds consisting of upper and lower sections, one section being movable under pressure toward and from the other. A given length of cable, say for instance, fifteen feet is passed between the mold sections and the casing molded and compressed. The molds are then opened and the next fifteen feet subjected to the operation of the molds, and so on throughout the length of the cable whatever such length may be.

In Fig. 3, a cable is shown composed of conductors arranged side by side and each consisting of a plurality or bunch of wires. 7 designates the conductors. 8 is the insulation of rubber or equivalent material around the same. 9 is the braid and 10 is the rubber sheath. 11 designates the spirally wound armor, and 12 the protective casing of rubber or equivalent material. The metal armor, as clearly shown in the drawings, is approximately semi-elliptical in cross section with its flat face disposed inwardly. This construction and arrangement has among its advantages the presentation of a broad flat surface to the rubber compound whereby any blows of pressure upon the metallic strip will not cause the same to cut into the rubber; and the provision of a rounded outer surface whereby the catching or scraping of articles by the cable when moved thereover will be avoided. In the form shown in Fig. 3, the entire cable is oblong in cross section instead of circular as in Figs. 1 and 2.

In Fig. 4 the metal armor designated 13 is embedded in the surface of the rubber sheathing 14 or sheathing of a rubber compound, or similar material, with the periphery of the armor exposed on the periphery of the sheathing. In Fig. 5 the sheathing designated 15 is surrounded by a metal armor 16 as in Fig. 5, and the armor surrounded by a molded casing 17 compressed on the armor 16 and sheath 15 and secured to the sheathing 15 and an additional armor 18 embedded in the outer face of the casing and exposed on the outside face or periphery thereof.

In Fig. 6, a cable is shown similar to that seen in Fig. 5, with the outer spirally wound armor 19 similar to the armor 18 embedded in the outer face of the compressed molded casing, and the inside arm or as 16 in Fig. 5 omitted.

My reenforced cables, on account of the rubber casing, around the coiled armor and joined to the sheathing beneath the armor, are practically unkinkable and capable of withstanding stresses and bending, twisting and crushing strains and abrasions under all working conditions.

What I claim is:

1. An electric cable, comprising in combination, one or more insulated electrical conductors, a surrounding sheath of vulcanized rubber insulating compound, and a metallic strip having an inwardly disposed flat surface and an outwardly disposed rounded surface applied to said sheath in the form of an open helix and so located with respect to the normal surface of the sheath that the angular edges of the strip are embedded in and covered by the material of the sheath.

2. An electric cable, comprising in combination, one or more insulated electrical conductors, two surrounding concentric sheaths of vulcanized rubber insulating compound united to each other by vulcanization under pressure, a helicoidal metallic strip located between said sheaths and having its convolutions separated from each other by substantially the width of said strip, and a second metallic strip of semi-elliptical cross section encircling the outer sheath in the form of an open helix with the flat surface of the strip toward the sheath and rounded surface outward, the angular edges of the strip lying below the normal surface of the outer sheath.

In testimony whereof, I have hereunto signed my name at Buffalo, in the county of Erie and State of New York, this 31st day of August, 1921.

HANS WODTKE.

CERTIFICATE OF CORRECTION.

Patent No. 1,707,700.     Granted April 2, 1929, to

HANS WODTKE.

It is hereby certified that error appears in the printed specification of the above numbered patent requiring correction as follows: Page 1, line 78, beginning with the article "The" strike out all to and including the word and period "avoided." in line 90; page 2, line 9, following the period, insert "The metal armor, as clearly shown in the drawings, is approximately semi-elliptical in cross section with its flat face disposed inwardly. This construction and arrangement has among its advantages the presentation of a broad flat surface to the rubber compound whereby any blows of pressure upon the metallic strip will not cause the same to cut into the rubber; and the provision of a rounded outer surface whereby the catching or scraping of articles by the cable when moved thereover will be avoided."; and that the said Letters Patent should be read with these corrections therein that the same may conform to the record of the case in the Patent Office.

Signed and sealed this 18th day of June, A. D. 1929.

(Seal)

M. J. Moore,
Acting Commissioner of Patents.

CERTIFICATE OF CORRECTION.

Patent No. 1,707,700.                                    Granted April 2, 1929, to

HANS WODTKE.

It is hereby certified that error appears in the printed specification of the above numbered patent requiring correction as follows: Page 1, line 78, beginning with the article "The" strike out all to and including the word and period "avoided." in line 90; page 2, line 9, following the period, insert "The metal armor, as clearly shown in the drawings, is approximately semi-elliptical in cross section with its flat face disposed inwardly. This construction and arrangement has among its advantages the presentation of a broad flat surface to the rubber compound whereby any blows of pressure upon the metallic strip will not cause the same to cut into the rubber; and the provision of a rounded outer surface whereby the catching or scraping of articles by the cable when moved thereover will be avoided."; and that the said Letters Patent should be read with these corrections therein that the same may conform to the record of the case in the Patent Office.

Signed and sealed this 18th day of June, A. D. 1929.

(Seal)                                                          M. J. Moore,
Acting Commissioner of Patents.